United States Patent [19]

Hill et al.

[11] Patent Number: 4,777,699

[45] Date of Patent: Oct. 18, 1988

[54] MOLDED HINGE ASSEMBLY

[75] Inventors: David A. Hill, St. Clair Shores, Mich.; Melvin S. Coons, Marion, Ind.

[73] Assignee: Sheller-Globe Corporation, Toledo, Ohio

[21] Appl. No.: 38,931

[22] Filed: Apr. 16, 1987

[51] Int. Cl.4 .......................... E05D 1/00; E05D 9/00
[52] U.S. Cl. ....................................... 16/225; 16/382; 16/385; 16/DIG. 13; 296/201
[58] Field of Search ......... 16/225, 382, 385, DIG. 13; 49/381; 296/201, 84 R

[56] References Cited

U.S. PATENT DOCUMENTS

| | | | |
|---|---|---|---|
| 1,963,941 | 6/1934 | Duffy | 16/225 |
| 3,633,316 | 1/1972 | Belser | 16/225 |
| 3,701,071 | 10/1972 | Landman | 16/225 |
| 3,806,188 | 6/1972 | Tantlinger | 16/225 |
| 4,139,234 | 2/1979 | Morgan | 296/84 R |
| 4,363,191 | 12/1982 | Morgan | 16/225 |

FOREIGN PATENT DOCUMENTS 3605017 8/1986 Fed. Rep. of Germany ...... 296/201

Primary Examiner—Nicholas P. Godici
Assistant Examiner—Edward A. Brown
Attorney, Agent, or Firm—Harness, Dickey & Pierce

[57] ABSTRACT

An improved molded hinge assembly is disclosed and is particularly adapted for pivoted vehicle window applications. The assembly allows for the pivotal mounting of a vehicle window in a window opening in a vehicle body panel while requiring little or no bonding or other affixation of the window gasket or hinge assembly to the outer surface of the window panel. Futhermore, the present invention provides a molded hinge assembly that is relatively simple and inexpensive to manufacture and to install in a vehicle window application. Such a hinge assembly can also be manufactured by reaction injection molding techniques from multi-constituent materials, such as urethane, for example, which allows molding at relatively low pressures to prevent or minimize glass breakage and provides for secure bonding and sealing between the window gasket and the window panel.

22 Claims, 3 Drawing Sheets

U.S. Patent     Oct. 18, 1988     Sheet 1 of 3     4,777,699
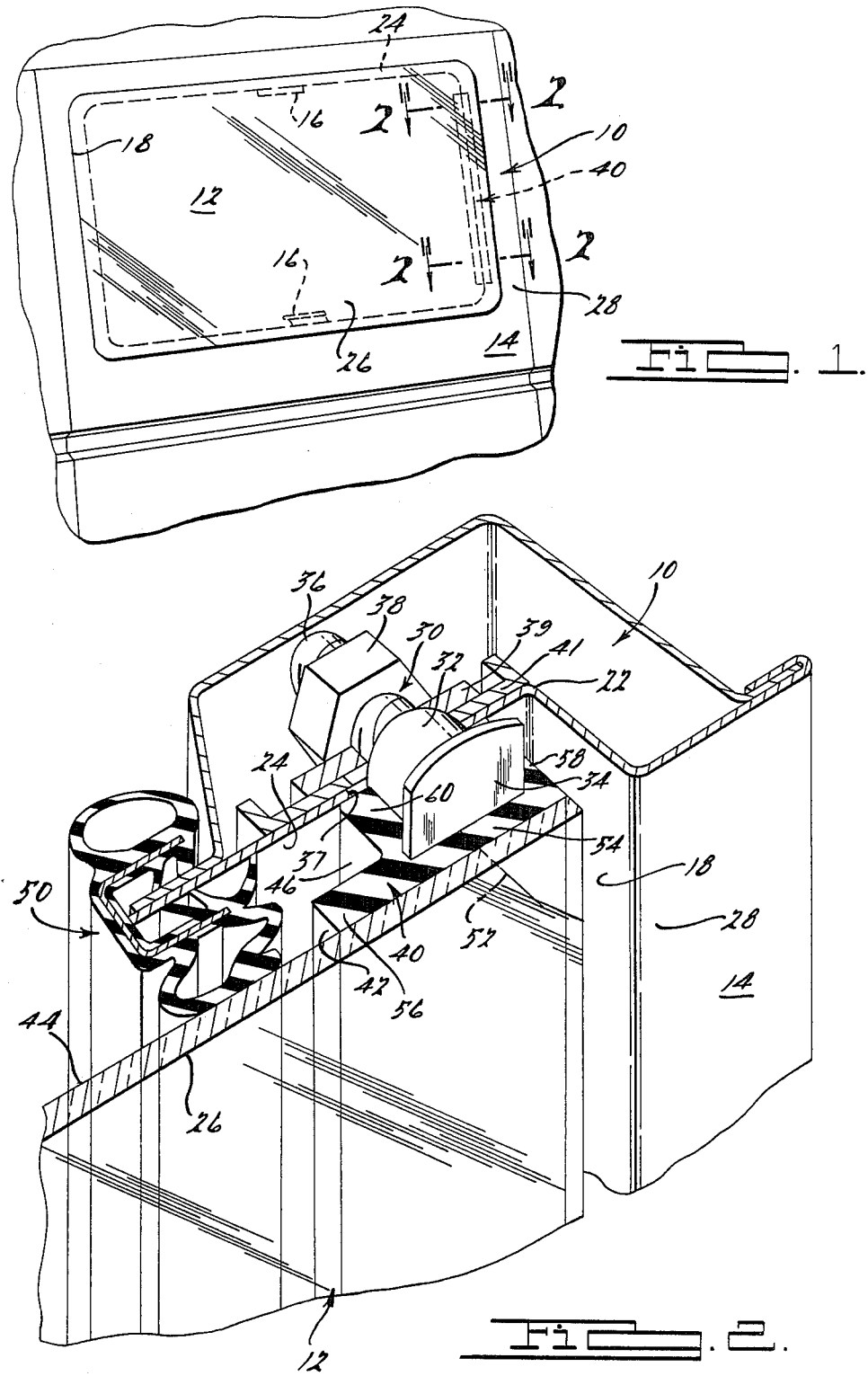

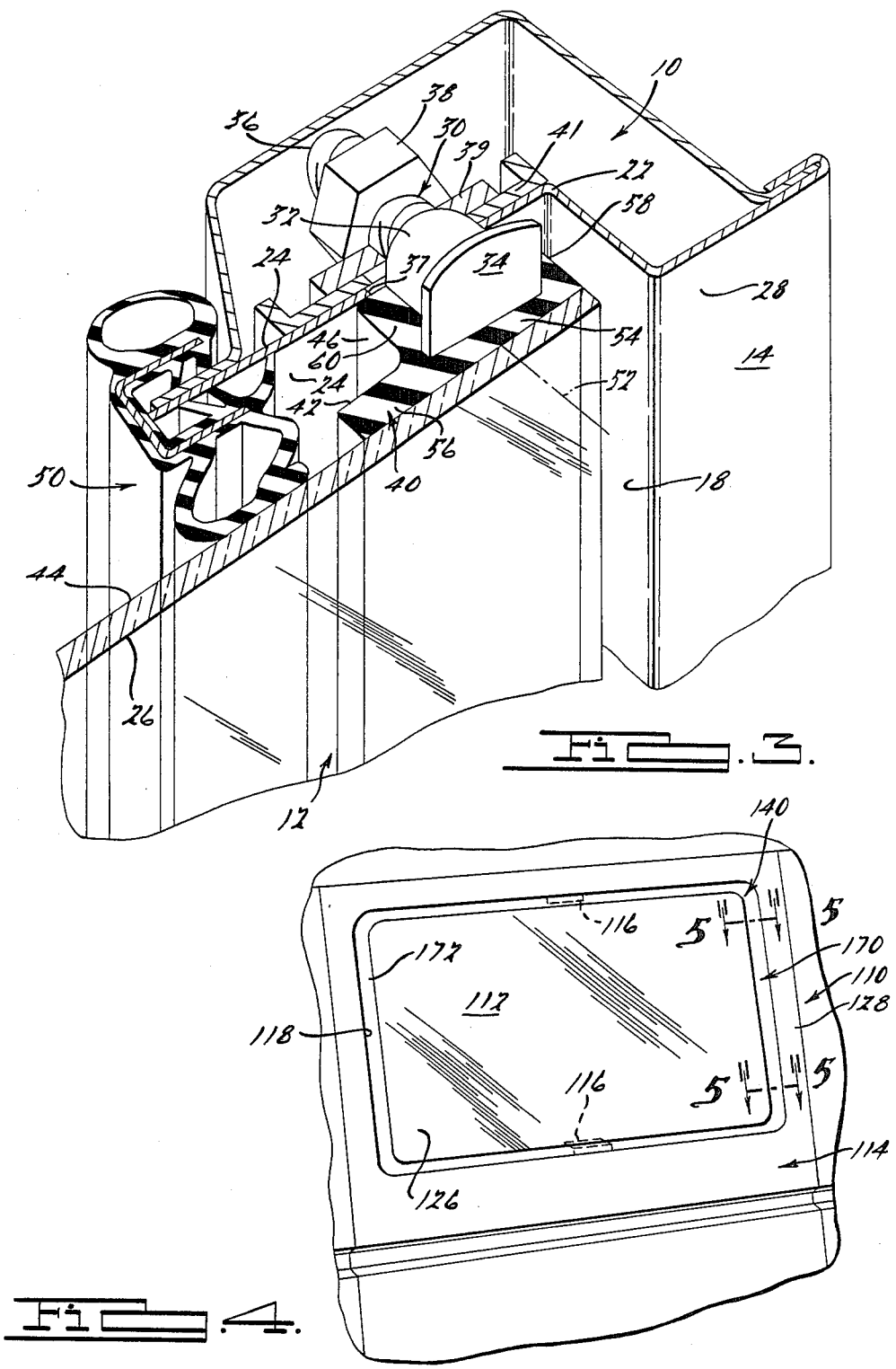

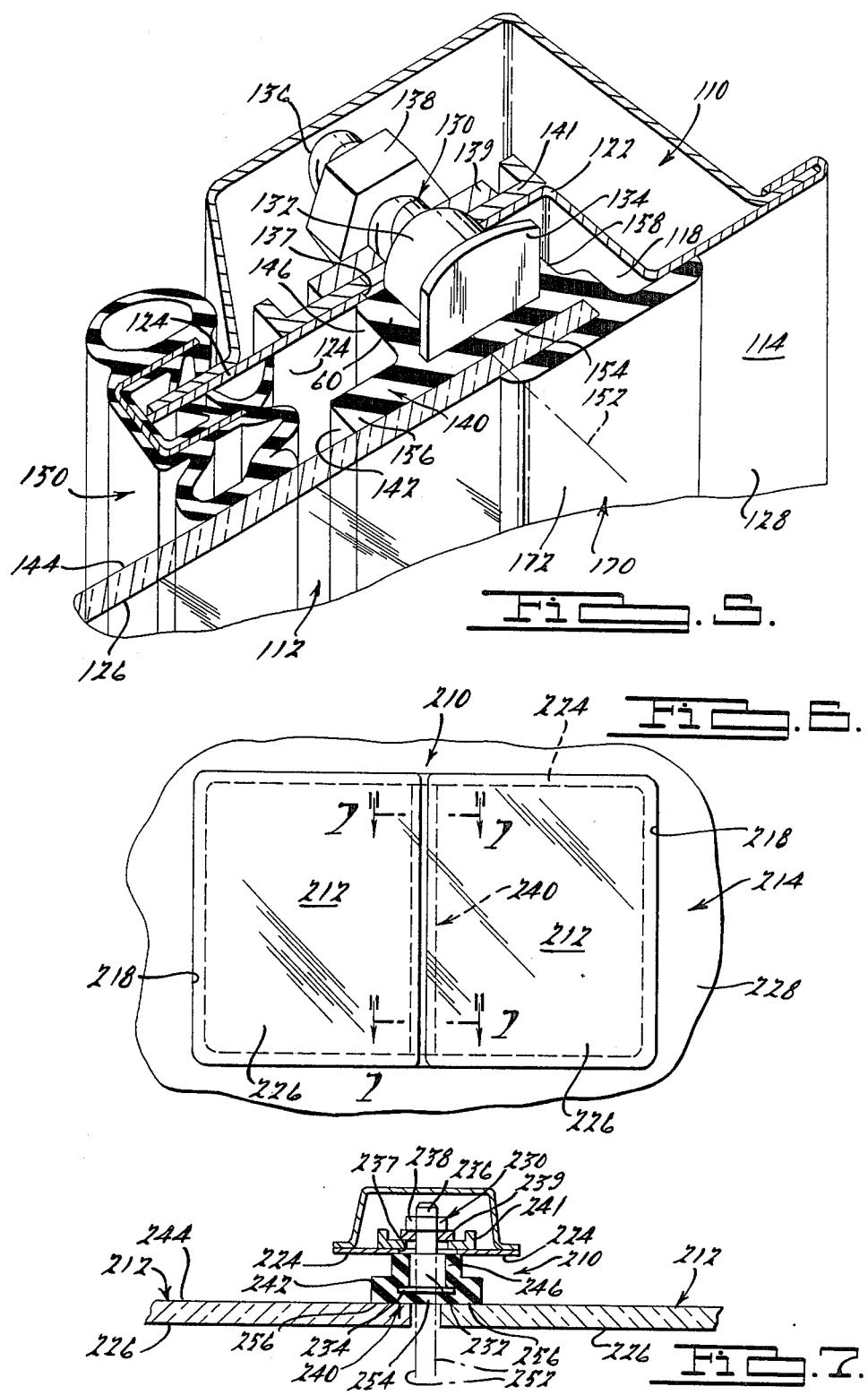

MOLDED HINGE ASSEMBLY

BACKGROUND AND SUMMARY OF THE INVENTION

The invention relates generally to molded hinge assemblies for pivotally mounting movable windows or other movable panels. More particularly, the invention relates to such hinge assemblies for automotive window applications wherein an automotive window panel is pivotally mounted in a window opening in a vehicle body pane. Reference is made to a related copending patent application, entitled Molded Urethane Window Gasket Assembly With Hinge Member and Apparatus And Method For Making Same, filed on Jan. 15, 1987, which is a continuation application of application Ser. No. 560,603, filed Dec. 12, 1983, both of which are assigned to the same assignee as the present invention. The disclosures of said related copending applications are hereby incorporated by reference.

It is well known in the art to fabricate various articles, such as vehicle window gaskets having hinge members or hinge portions thereon, from materials such as polyvinylchloride (PVC), using conventional compression or injection molding techniques. In many instances, such window gaskets have been injection molded directly onto a window panel composed of glass or other substantially transparent materials. Such window and gasket assemblies have been installed in window openings in vehicle body panels with adhesives coupled with integrally molded fastener protrusions, as disclosed for example in U.S. Pat. Nos. 4,072,340 and 4,139,234. It has been found, however, that window panel breakage has been unacceptably high in many of such prior art applications due to high pressures required in injection molding processes and because of the hardness and rigidity of the mold structures and mold materials involved. Furthermore, because of the composition of such gasket and window assemblies, it has been found that proper adhesion and sealing of thee gaskets to the metal body panels and to the glass window panels has been difficult to attain, thus resulting in water leaks, wind noise, and other related problems.

In addition to the various drawbacks discussed above, such prior art hinge-and-gasket assemblies have frequently been inordinately complex and expensive to manufacture, as well as being difficult, time-consuming, and relatively expensive to install in vehicle window openings. Furthermore, such prior art assemblies have frequently required a portion of the gasket or hinge assembly to be affixed to both the edges of a window panel by way of a bezel or other such frame member, thereby resulting in an outwardly-extending protrusion at the window and body interface. Such protrusions not only detract from the appearance of the vehicle, but also contribute to air turbulence and wind resistance forces exerted on the vehicle, thus detracting from the vehicle's performance and fuel economy.

In accordance with the present invention, an improved molded hinge assembly is particularly adapted for vehicle window applications and allows for the pivotal mounting of a vehicle window in a window opening in a vehicle body panel while requiring little or no bonding or other affixation of the window gasket or hinge assembly to the outer surface of the window panel. Furthermore, the present invention provides a molded hinge assembly that is relatively simple and inexpensive to manufacture and to install in a vehicle window application. Such a hinge assembly according to the present invention can also be manufactured by reaction injection molding techniques from multi-constituent materials, such as urethane, for example, which allows molding at relatively low pressures to prevent or minimize glass breakage and provides for secure bonding and sealing between the window gasket and the window panel.

According to the present invention, a hinge assembly adapted for pivotally interconnecting a window panel in a window opening in a vehicle body panel includes a mounting stud member having inner and outer ends, with provisions for fixedly interconnecting the inner end of the mounting stud with the vehicle body, and a flexible elastomeric hinge member secured at least to the outer end of the mounting stud and to the window panel. The elastomeric hinge member is configured such that when the window panel is pivotally moved outwardly away from the window opening, a first portion of the elastomeric hinge member is resiliently elongated in a generally outward direction, and a second portion of the elastomeric hinge member is resiliently compressed in a generally inward direction.

Preferably the elastomeric hinge member is integrally molded onto at least the outer end of the mounting stud and is secured directly to the window panel, without the need for a mechanical fastener device. This arrangement allows for direct bonding of the hinge member to only the inner surface of the window panel. The bonding to the glass can be accomplished by integrally molding the hinge member directly to the window panel glass, preceded by the application of a primer to the glass. Because the elastomeric hinge member flexes to allow for pivotal movement of the window panel relative to the vehicle body panel, substantially no movement or articulation of the mounting stud is required. This greatly simplifies the hinge assembly and reduces the cost of manufacture and installation of the window-and-hinge assembly when compared with those having a number of articulated components.

In the preferred form of the invention, the elastomeric hinge member generally surrounds and is integrally molded on the mounting stud to extend and seal between the window panel and the area of the vehicle body panel adjacent the window opening.

Additional objects, advantages, and features of the present invention will become apparent from the following description and appended claims, taken in conjunction with the accompanying drawings.

BRIEF DESCRIPTION OF THE DRAWINGS

FIG. 1 is an elevational view of one preferred hinge and window panel assembly installed in a vehicle body panel for pivotal movement of the window panel relative to the vehicle body panel.

FIG. 2 is a cross-sectional view taken generally along lines 2—2 of FIG. 1.

FIG. 3 is a cross-sectional view similar to that of FIG. 2, but showing the window panel in a pivoted position.

FIG. 4 is an elevational view similar to that of FIG. 1, but illustrating an alternate embodiment of the present invention.

FIG. 5 is a cross-sectional view taken generally along lines 5—5 of FIG. 4.

FIG. 6 is an elevational view similar to those of FIGS. 1 and 4, but illustrating still another alternate embodiment of the present invention.

FIG. 7 is a cross-sectional view taken generally along lines 7—7 of FIG. 6.

DETAILED DESCRIPTION OF THE PREFERRED EMBODIMENTS

In FIGS. 1 through 7, exemplary embodiments of the present invention are illustrated in elastomeric molded hinge assemblies adapted for pivotally interconnecting a vehicle window panel to a vehicle body panel for limited pivotal movement relative thereto. One skilled in the art will readily recognize from the following discussion, however, that the principles of the invention are equally applicable to vehicle window hinge assemblies having configurations other than those shown for purposes of illustration in the drawings, as well as to non-vehicular applications wherein two or more panels or other members are hingedly interconnected with one another.

In FIGS. 1 through 3, an exemplary window hinge assembly 10 pivotally interconnects a window panel 12 with a vehicle body panel 14 for selective hinged or pivotal movement of the window panel 12 outwardly away from a window opening 18 or inwardly toward the window opening 18 from the open position. As is well known in the art, one or more articulated handles and/or assemblies 16 can be provided for actuating and/or vertically supporting the window panel 12 during its pivotal movement, as well as for limiting its maximum outward pivotal movement. As perhaps best seen in FIG. 2, the vehicle body panel 14 typically includes a recessed or stepped portion 22, with an inwardly inset body flange 24 in order to accommodate the thickness of the window panel 12 and a portion of the hinge assembly 10 in order to provide for a substantially flush relationship between the outer surface 26 of the window panel 12 and the outer surface 28 of the vehicle body panel 14.

The window hinge assembly 10 preferably includes a mounting stud assembly 30 and an elastomeric hinge assembly 40. The mounting study assembly 30, which can be either a one-piece or a multi-piece structure, includes a mounting stud 32 having a preferably flanged outer end 34 and an inner end 36, which extends through an aperture 37 in the body flange 24 and is preferably threaded to threadably receive a nut 38. A washer 39 and a bearing member 41 are also preferably disposed between the nut 38 and the inside of the body flange 24 in order to clampingly secure the mounting stud 32 to the body flange 24 and to distribute and stabilize the mounting forces of the hinge assembly 10 along the body flange 24.

The elastomeric hinge member 40 preferably includes an outer flange 42 adapted to sealingly engage and be bonded to the inner surface 44 of the window panel 12, and an inner body 46 extending from the outer flange 42 inwardly to engage the body flange 24. The elastomeric hinge member 40 extends vertically along a substantial portion of the edge of the window panel 12 and the window opening 18 and thus preferably includes two or more mounting stud assemblies 30 for hingedly supporting the window panel 12.

Typically, a sealing gasket 50 is provided on the body flange 24 for sealingly engaging the inner surface 44 of the window panel 12 in order to provide for a substantially wind-proof and water-proof relationship of the closed window panel 12 with the vehicle body panel 14. The elastomeric hinge member can be integrally formed with a window gasket sealing member extending about the periphery of the window panel for sealing engagement with the vehicle body when the window panel is in its closed position, as shown in FIGS. 4 and 5 and discussed below. In such an arrangement, the sealing gasket 50 might not be needed and thus could optionally be eliminated.

In operation, when the window panel 12 is pivoted outwardly away from the window opening 18, the window panel 12 pivots about an effective fulcrum lying along a vertical plane (extending through phantom line 52 in FIGS. 2 and 3) that is offset from the centerline of the hinge assembly 10 in a direction toward the interior of the window panel 12 and away from the adjacent portion of the vehicle body panel 14. The exact inward or outward lateral position of the effective pivoting fulcrum for the window panel 12 along the plane 52 is believed to vary inwardly or outwardly on the elastomeric hinge member 40, depending upon the pivotal position of the window panel 12 relative to the vehicle body panel 14 and the resultant amount of flexure of the elastomeric hinge member 40. During outward pivotal movement of the window panel 12 away from the body flange 24, as shown in FIG. 3, one portion 54 of the outer flange 42 is resiliently compressed on one side of the vertical plane 52, and another portion 56 of the outer flange 42 is stretched or elongated on the opposite side of the plane 52. Similarly, depending upon the amount of outward pivotal movement of the window panel 12, one portion 58 of the inner body 46 of the elastomeric hinge member 40, which is generally adjacent the first flange portion 54, also is resiliently compressed during outward pivotal movement of the window panel 12, while another body portion 60 generally adjacent the second flange portion 56 is stretched or elongated during such outward pivotal movement of the window panel 12.

The above-discussed flexure of the elastomeric hinge member 40, along with the substantial width of the outer flange 42, allow the elastomeric hinge member 40 to be secured to the inner surface 44 of the window panel 12 (without the need for a mechanical fastener device), while accommodating the pivotal movement of the window panel 12 relative to the substantially fixed mounting stud assembly 30. Such an arrangement thereby simplifies and reduces the cost of a window hinge assembly according to the present invention as compared to that of some prior art hinge assemblies, while allowing for a substantially flush, protrusion-free relationship between the window panel 12 and the vehicle body panel 14 due to the fact that the entire hinge assembly 10 is disposed inwardly of the outer surface 28 of the vehicle body panel 14 with no part of the hinge assembly 10 protruding outwardly to the outer surface 26 of the window panel 12. As mentioned above, such a relationship enhances the appearance of a vehicle in which the hinge assembly 10 is employed, as well as reducing the wind resistance on the vehicle and thus contributing to its performance and fuel economy.

As mentioned above, the mounting stud assembly 30 shown in FIGS. 1 through 3 can include a mounting stud 32 having a preferably flanged outer end 34 and an inner end 36, which are fabricated as a one-piece structure. Optionally, however, the inner end 36 can be fabricated as a separate, preferably threaded stud member that is threadably received and secured within an internally threaded opening in the mounting stud 32. In such an arrangement, the separate mounting stud 32, with its preferably flanged outer end 34, can consist of a threaded fastener, such as the type designated by the trademark TEENUT, as produced by TRW Inc., for example. In either of these alternate constructions, which are applicable in any of the embodiments of the invention, the elastomeric hinge member 40 is preferably integrally molded onto at least the flanged outer end 34, and preferably onto the entire mounting stud 32. In one preferred form of the invention, the elastomeric hinge member 40 is fabricated and integrally molded onto the mounting stud 32 by reaction injection molding techniques, using multi-constituent molding materials, such as urethane, for example. This preferred fabrication provides for a secure bonding and sealing between the elastomeric hinge member 40 and the window panel 12. Furthermore, especially in the variation on the present invention shown in FIGS. 4 and 5 and discussed below, such a fabrication allows for molding of a combination, or integrally-formed, elastomeric hinge member and window gasket member. As one skilled in the art will readily recognize, such alternate one-piece or multi-piece mounting stud structures, as well as the above-mentioned reaction injection molding fabrication, can be employed in any of the embodiments of the present invention discussed herein and shown in the drawings.

FIGS. 4 and 5 illustrate another embodiment of the present invention, which is generally similar to that shown in FIGS. 1 through 3, with certain exceptions noted below. Because many of the components of the embodiment of FIGS. 1 through 3 and the embodiment of FIGS. 4 and 5 are identical or at least generally similar, such corresponding components in FIGS. 4 and 5 are indicated by reference numerals corresponding to those of FIGS. 1 through 3, but having one-hundred prefixes.

In FIGS. 4 and 5, the window panel 112 is provided with a window gasket 170 extending substantially about its entire periphery, with an outer lip portion 172 engaging, and preferably sealingly bonded to, the outer surface 126 of the window panel 12. The window gasket 170, in FIGS. 4 and 5 is integrally molded as a one-piece structure with the elastomeric hinge member 140 and is configured to sealing engage the window opening 118 in the vehicle body panel 114 when the window panel 12 is in its closed position. Therefore, although a sealing gasket 150 is shown on the body flange 124 in FIG. 5, the sealing gasket 150 can optionally be eliminated in many applications due to the sealing relationship between the window panel 112 and the vehicle body panel 114 provided by way of the integral window gasket 170.

FIGS. 6 and 7 illustrate a further alternate embodiment of the present invention that is generally similar to the embodiments shown in FIGS. 1 through 5, except that two or more window panels 212 are pivotally disposed within a vehicle body panel 214. Because many of the components of the embodiments of FIGS. 1 through 5 correspond, or are identical or generally similar, to components of the embodiment of FIGS. 6 and 7, such corresponding components of the embodiment of FIGS. 6 and 7 are indicated by reference numerals that are similar to those of the corresponding components shown in FIGS. 1 through 5, except that the reference numerals in FIGS. 6 and 7 have two-hundred prefixes.

Because the two window panels 212 are disposed for opposite pivotal motion, a pair of vertical planes 252 exist, along which the effective pivoting fulcrums for the window panels 212 are disposed. In a manner similar to that described above in connection with FIGS. 1 through 3, the exact inward or outward lateral positions of the effective pivoting fulcrums for the respective window panels 212 along the respective vertical planes 252 are believed to vary inwardly or outwardly on the elastomeric hinge member 240, depending upon the pivotal positions of the respective window panels 212 relative to the vehicle body panel 214 and the resultant amount of flexure of the resiliently compressed portions 254 and the resiliently stretched or elongated portions 256. Similarly, depending upon the degree of pivoting movement of one or both of the window panels 212, the forward and rearward locations of the vertical planes 252 can also vary somewhat.

As was discussed above in connection with FIGS. 1 through 3, depending upon the amount of outward pivotal movement of the window panels 212, the inner body 246 is resiliently stretched or elongated on both sides of the mounting stud 232 if both of the window panels 212 are pivotally opened. Correspondingly, if only one of the window panels 212 is opened, the inner body 246 of the elastomeric hinge member 240 is resiliently stretched or elongated on the same side of the mounting stud 232 as the pivotally opened window panel 212, while the inner body 246 on the opposite side of the mounting stud 232 is believed to be resiliently compressed. In other respects, however, the embodiment shown in FIGS. 6 and 7 functions generally similar to those described above and shown in FIGS. 1 through 5, as will be readily recognized by one skilled in the art from the discussion above in connection with other embodiments of the invention.

The foregoing discussion discloses and describes exemplary embodiments of the present invention. One skilled in the art will readily recognize from such discussion, and from the accompanying drawings and claims, that various changes, modifications and variations may be made therein without departing from the spirit and scope of the invention as defined in the following claims.

What is claimed is:

1. In a window assembly having at least one window panel having an inner surface and an outer surface and being adapted to be disposed in a window opening in a vehicle body panel, and a hinge assembly for interconnecting the window panel with the vehicle body panel for pivotal movement generally inwardly toward and outwardly away from the window opening in a direction transverse to the window panel, said hinge assembly comprising: a mounting stud having inner and outer ends; mounting means for fixedly interconnecting said inner end of said mounting stud with the vehicle body panel; a flexible elastomeric hinge member secured to said outer end of said mounting stud between said mounting stud and the window panel; said outer end of said mounting stud having an enlarged flange portion thereon, said elastomeric hinge member generally surrounding said enlarged flange portion of said mounting stud; and means for securing said elastomeric hinge member to the window panel, at least a fist outer portion of said elastomeric hinge member being resiliently elongated outwardly between said enlarged flange portion of said mounting stud and the window panel and at least a second outer portion of said elastomeric hinge member being resiliently compressed inwardly between said enlarged flange portion of said mounting stud and the window panel when the window panel is pivotally moved outwardly away from the window opening, said first and second outer portions of said elastomeric hinge member being generally adjacent said window panel, said elastomeric hinge member including an outer flange portion secured to the window panel, said window panel being secured to said outer flange portion outwardly and directly over said mounting stud so as to interpose said flange portion between the outer surface of the mounting stud and the inner surface of the window panel, said outer flange portion of said hinge member including said first and second portions, and said first and second portions being disposed outward of said enlarged flange portion of said mounting stud and inward of the window panel between said enlarged flange portion of said mounting stud and the window panel.

2. The invention according to claim 1, wherein said elastomeric hinge member is integrally molded onto said outer end of said mounting stud.

3. The invention according to claim 2, wherein said elastomeric hinge member is secured directly to the window panel without the use of a mechanical fastener device.

4. The invention according to claim 1, wherein at least said first and second outer portions are of a substantially constant thickness.

5. The invention according to claim 2, wherein said elastomeric hinge member is bonded directly to only the inner surface of the window panel without the sue of a mechanical fastener device.

6. The invention according to claim 1, wherein said elastomeric hinge member is reaction injection molded from a multi-constituent urethane material and is integrally molded onto said outer end of said mounting stud.

7. The invention according to claim 6, wherein said elastomeric hinge member is secured directly to the window panel without the use of a mechanical fastener device.

8. The invention according to claim 6, wherein said elastomeric hinge member is bonded directly to only the inner surface of the window panel without the use of a mechanical fastener device.

9. The invention according to claim 1, wherein said elastomeric hinge member is secured directly to the window panel without the use of a mechanical fastener device.

10. The invention according to claim 1, wherein said elastomeric hinge member is bonded directly to only the inner surface of the window panel without the use of a mechanical fastener device.

11. The invention according to claim 1, wherein said elastomeric hinge member is integrally molded onto said outer end of said mounting stud.

12. The invention according to claim 1, wherein said elastomeric hinge member generally surrounds said outer end of said mounting stud and includes an inner portion extending inwardly from the window panel to the vehicle body panel, said inner portion of said elastomeric hinge member being resiliently elongated generally adjacent said first portion and resiliently compressed generally adjacent said second portion between the vehicle body panel and the window panel when the window panel is pivotally moved outwardly away from the window opening.

13. The invention according to claim 1, wherein said mounting stud includes external threads on at least said inner end, said mounting means including an internally threaded fastener threadably engageable with said inner end for fixedly interconnecting said mounting stud with the vehicle body panel.

14. The invention according to claim 1, wherein said hinge assembly includes a number of said mounting studs, said elastomeric hinge member extending along the window panel in a direction transverse to said mounting studs, said mounting studs being spaced apart transversely along said elastomeric hinge member.

15. In a window panel assembly having at least one window panel having an inner and outer surface and being adapted to be disposed in a window opening in a vehicle body panel, and a hinge assembly for interconnecting the window panel with the vehicle body panel for pivotal movement generally inwardly toward and outwardly away from the window opening in a direction transverse to the window panel, said hinge assembly comprising: a mounting stud having inner and outer ends; mounting means for fixedly interconnecting said inner end of said mounting stud with the vehicle body panel; a flexible elastomeric hinge member integrally molded onto and generally surrounding said outer end of said mounting stud and extending inwardly from the window panel to the vehicle body panel, said elastomeric hinge member including an outer flange portion thereon; said outer end of said mounting stud having an enlarged flange portion thereon, said outer flange portion of said elastomeric hinge member generally surrounding said enlarged flange portion of said mounting stud; and means for securing said flange portion of said elastomeric hinge member to the window panel, said window panel being secured to said outer flange portion outwardly and directly over said mounting stud so as to interpose said flange portion between the outer surface of the mounting stud and the inner surface of the window panel, a first portion of said flange portion of said elastomeric hinge member being resiliently elongate outwardly between said enlarged flange portion of said mounting stud and the window panel and between the vehicle body panel and the window panel when the window panel is pivotally moved outwardly away from the window opening, and a second portion of said flange portion of said elastomeric hinge member being resiliently compressed inwardly between said enlarged flange portion of said mounting stud and the window panel and between the vehicle body panel and the window panel when the window panel is pivotally moved outwardly away from the window opening, and said first and second portions being disposed outward from said enlarged flange portion of said mounting stud and inward of the window panel between said enlarged flange portion of said mounting stud and the window panel.

16. The invention according to claim 15, wherein said flange portion of said elastomeric hinge member is bonded directly to only the inner surface of the window panel without the use of a mechanical fastener device.

17. The invention according to claim 15, wherein said elastomeric hinge member is reaction injection molded from a multi-constituent urethane material and is integrally molded onto said outer end of said mounting stud.

18. The invention according to claim 15, wherein said mounting stud includes external threads on at least said inner end, said mounting means including an internally threaded fastener threadably engageable with said inner end for fixedly interconnecting said mounting stud with the vehicle body panel.

19. The invention according to claim 15, wherein said hinge assembly includes a number of said mounting studs, said elastomeric hinge member extending along the window panel in a direction transverse to said mounting studs, said mounting studs being spaced apart transversely along said elastomeric hinge member.

20. In a window panel assembly having at least one window panel having an inner and outer surface and being adapted to be disposed in a window opening in a vehicle body panel, and a hinge assembly for interconnecting the window panel with the vehicle body panel for pivotal movement generally inwardly toward and outwardly away from the window opening in a direction transverse to the window panel, said hinge assembly comprising: a mounting stud having an inner end and an enlarged outer end; mounting means for fixedly interconnecting said inner end of said mounting stud with the vehicle body panel; and a flexible elastomeric hinge member integrally molded onto and generally surrounding said enlarged outer end of said mounting stud and extending inwardly from the window panel to the vehicle body panel, said elastomeric hinge member including an outer flange portion thereon, said elastomeric hinge member being reaction injection molded from a multi-constituent urethane material, said flange portion of said elastomeric hinge member being bonded directly to only the inner surface of the window panel without the use of a mechanical fastener device, said window panel being secured to said outer flange portion outwardly and directly over said mounting stud so as to interpose said flange portion between the outer surface of the mounting stud and the inner surface of the window panel, a first portion of said flange portion of said elastomeric hinge member being resiliently elongated outwardly between said enlarged flange portion of said mounting stud and the window panel and between the vehicle body panel and the window panel when the window panel is pivotally moved outwardly away from the window opening, and a second portion of said flange portion of said elastomeric hinge member being resiliently compressed inwardly between said enlarged flange portion of said mounting stud and the window panel and between the vehicle body panel and the window panel when the window panel is pivotally moved outwardly away from the window opening, and said first and second portions being disposed outward of said enlarged flange portion of said mounting stud and inward of the window panel between said enlarged flange portion of said mounting stud and the window panel.

21. The invention according to claim 20, wherein said mounting stud includes external threads on at least said inner end, said mounting means including an internally threaded fastener threadably engageable with said inner end for fixedly interconnecting said mounting stud with the vehicle body panel.

22. The invention according to claim 20, wherein said hinge assembly includes a number of said mounting studs, said elastomeric hinge member extending along the window panel in a direction transverse to said mounting studs, said mounting studs being spaced apart transversely along said elastomeric hinge member.

* * * * *

UNITED STATES PATENT AND TRADEMARK OFFICE
CERTIFICATE OF CORRECTION

PATENT NO. : 4,777,699
DATED : October 18, 1988
INVENTOR(S) : David A. Hill, Melvin S. Coons It is certified that error appears in the above-identified patent and that said Letters Patent is hereby corrected as shown below:

Column 1, line 12, "pane" should be --panel--.

Column 1, line 35, after "to" insert --the--.

Column 1, line 40, "thee" should be --the--.

Column 3, line 43, "study" should be --stud--.

Column 5, line 46, "sealing" should be --sealingly--.

Column 5, line 48, "12" should be --112--.

Column 6, line 62, claim 1, "fist" should be --first--.

Column 7, line 6, claim 1, delete "secured to the window panel".

Column 7, line 29, claim 5, "sue" should be --use--.

Column 8, lines 37, 38, claim 15, "elongate" should be --elongated--.

Column 8, line 49, claim 15, "from" should be --of--.

Column 9, lines 16, 17, claim 20, "fixedlyinterconnecting" should be --fixedly interconnecting--.

Signed and Sealed this

Twenty-eighth Day of February, 1989

*Attest:*

DONALD J. QUIGG

*Attesting Officer*  *Commissioner of Patents and Trademarks*